US008077658B2

(12) United States Patent
Wu

(10) Patent No.: US 8,077,658 B2
(45) Date of Patent: Dec. 13, 2011

(54) PACKET FORWARDING IN MULTI-RADIO MULTI-HOP WIRELESS NETWORKS

(75) Inventor: Yunnan Wu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 816 days.

(21) Appl. No.: 11/906,297

(22) Filed: Oct. 1, 2007

(65) Prior Publication Data

US 2009/0086664 A1     Apr. 2, 2009

(51) Int. Cl.
*H04W 4/00* (2009.01)
*H04L 12/28* (2006.01)
*H04L 12/56* (2006.01)

(52) U.S. Cl. .................... 370/328; 370/392; 370/414

(58) Field of Classification Search .............. 370/328, 370/389, 392, 412–418
See application file for complete search history.

(56) References Cited

U.S. PATENT DOCUMENTS

| | | | | |
|---|---|---|---|---|
| 5,848,145 A * | 12/1998 | Gallagher et al. | ....... | 379/221.06 |
| 6,175,569 B1 * | 1/2001 | Ellington et al. | ............. | 370/401 |
| 6,269,079 B1 * | 7/2001 | Marin et al. | ................... | 370/230 |
| 6,421,149 B2 * | 7/2002 | Tervonen et al. | ................. | 398/9 |
| 6,714,554 B1 * | 3/2004 | Jin et al. | ........................ | 370/412 |
| 6,963,533 B2 * | 11/2005 | Kukic | ........................... | 370/228 |
| 7,065,376 B2 | 6/2006 | Wolman et al. | | |
| 7,161,926 B2 | 1/2007 | Elson et al. | | |
| 7,177,268 B2 * | 2/2007 | Shinagawa | .................... | 370/217 |
| 2005/0195815 A1 * | 9/2005 | Chaudhuri | .................... | 370/389 |
| 2005/0243835 A1 * | 11/2005 | Sharma et al. | ........... | 370/395.42 |
| 2006/0240835 A1 | 10/2006 | Jain et al. | | |
| 2007/0002804 A1 | 1/2007 | Xiong et al. | | |
| 2007/0015540 A1 * | 1/2007 | Sakata et al. | .................. | 455/560 |
| 2007/0072604 A1 | 3/2007 | Wang | | |
| 2007/0104215 A1 | 5/2007 | Wang et al. | | |
| 2007/0147248 A1 | 6/2007 | Kodialam et al. | | |
| 2008/0267106 A1 * | 10/2008 | Buddhikot et al. | ........... | 370/312 |
| 2008/0268778 A1 * | 10/2008 | De La Garrigue et al. | .. | 455/41.2 |
| 2009/0042555 A1 * | 2/2009 | Zhu et al. | .................... | 455/422.1 |
| 2011/0060819 A1 * | 3/2011 | Salkewicz | ..................... | 709/223 |

FOREIGN PATENT DOCUMENTS

WO     2007053141 A1     5/2007

OTHER PUBLICATIONS

Adya, et al., "A Multi-Radio Unification Protocol for IEEE 802.11Wireless Networks", Proceedings of the First International Conference on Broadband Networks, Date: 2004, pp. 1-11.
Cheng, et al., "Parallel Use of Multiple Channels in Multi-hop 802.11Wireless Networks", Date: 2006, pp. 1-9, IEEE MILCOM.
Draves, et al., "Routing in Multi-Radio, Multi-Hop Wireless Mesh Networks", Date: Sep. 26-Oct. 1, 2004, pp. 1-15. ACM Press, US.
So, et al., "A Routing Protocol for Utilizing Multiple Channels in Multi-Hop Wireless Networks with a Single Transceiver", pp. 1-10.

* cited by examiner

*Primary Examiner* — Ronald Abelson
(74) *Attorney, Agent, or Firm* — Lyon & Harr, LLP; Richard T. Lyon

(57) ABSTRACT

A packet forwarding technique is presented that forwards data packets through a multi-hop wireless network employing multi-radio nodes. In each multi-radio node, an output buffer is shared among the radios. Outgoing packets are stored in this buffer. Whenever there is a transmission opportunity on the radios sharing the output buffer, the node examines the buffer and searches for packets that are scheduled to be transmitted to a neighboring node having an open communication link with the transmitting node. The packet in the discovered group that has the highest transmission priority is then transmitted to its next scheduled node.

5 Claims, 6 Drawing Sheets

PACKET FORWARDING IN MULTI-RADIO MULTI-HOP WIRELESS NETWORKS

BACKGROUND

A wireless multi-hop network, sometimes referred to as a wireless mesh network, is a co-operative communication infrastructure between individual wireless transceivers (called radios) resident in distributed devices acting as nodes of the network. Communication between an initiating and destination node is carried out through a number of intermediate nodes whose function is to relay information from one point to another. Each such relay is referred to as a "hop". In order to accomplish this task, each node communicates packet routing information to neighboring nodes within range. Whenever a data packet is received by a node, it determines what to do with it based on the routing information. This may be to pass it on to a neighboring node, keep it, or both.

Using multiple radios in a node of a multi-hop wireless network is an effective technique for enhancing the network's capacity by allowing for a high degree of parallelism in data transmission. For example, multiple communication links can exist between two neighboring multi-radio nodes when more than one radio of a node is within range of a neighboring node. This means that a node can send and receive data packets at the same time. In addition, each multi-radio node can have one or more communication links with a plurality of its neighboring nodes, rather than just one.

SUMMARY

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The packet forwarding technique generally provides an efficient forwarding of data packets through a multi-hop wireless network employing multi-radio nodes. In one embodiment of the technique, a data packet is forwarded by first storing data packets being forwarded from the multi-radio node in an output buffer shared by at least two radios of the multi-radio node. The stored data packets each have a transmission priority assigned to them in accordance with the particular protocols of the wireless network. Communication links that are available to transmit a data packet between at least one of the radios and another node or nodes of the wireless network, are identified next. Once the communication links have been identified, the multi-radio node finds data packets stored in the shared buffer that are scheduled for transmission to a network node associated with one or more of the identified communication links, and then identifies the packet in this group that has the highest priority. The identified data packet is transmitted to the neighboring node it is scheduled to be forwarded to via one of the identified links to that node. In a simplified embodiment of the technique, only one communication link is identified. Thus, in this latter embodiment, the node simply finds data packets stored in the shared output buffer that are scheduled for transmission to the node associated with the identified communication link, and then identifies the packet in this group having the highest priority. The identified packet is then transmitted to the neighboring node via the identified link.

In addition to the just described benefits, other advantages will become apparent from the detailed description which follows hereinafter when taken in conjunction with the drawing figures which accompany it.

DESCRIPTION OF THE DRAWINGS

The specific features, aspects, and advantages of the disclosure will become better understood with regard to the following description, appended claims, and accompanying drawings where:

DETAILED DESCRIPTION

In the following description of embodiments of the invention reference is made to the accompanying drawings which form a part hereof, and in which are shown, by way of illustration, specific embodiments in which the invention may be practiced. It is understood that other embodiments may be utilized and structural changes may be made without departing from the scope of the invention.

1.0 The Computing Environment

Before providing a description of embodiments of the packet forwarding technique, a brief, general description of a suitable computing environment in which portions thereof may be implemented will be described. The technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
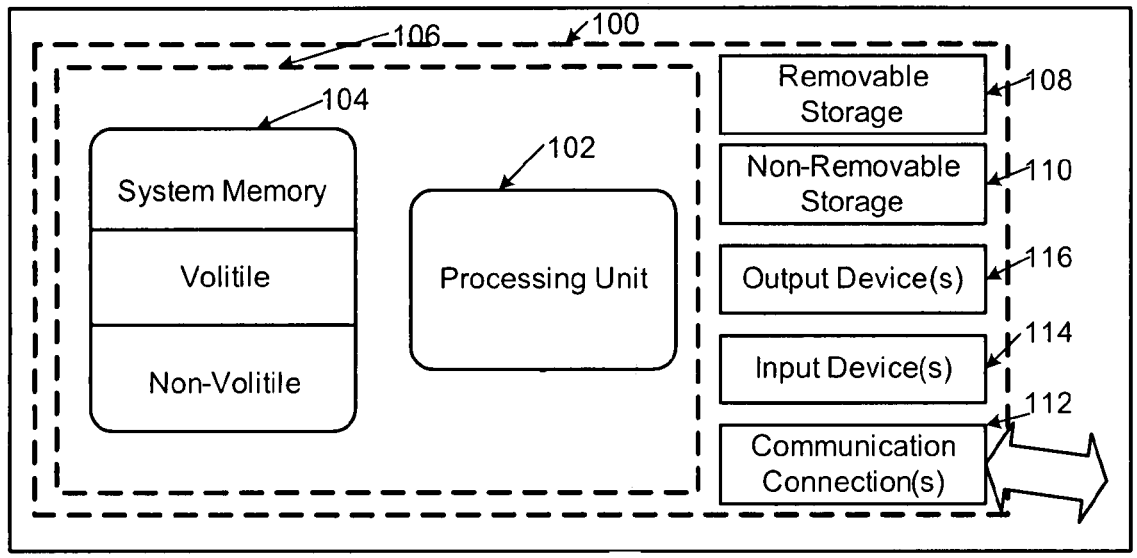
FIG. 1 is a diagram depicting a general purpose computing device constituting an exemplary system for implementing a packet forwarding technique.

FIG. 1 illustrates an example of a suitable computing system environment. The computing system environment is only one example of a suitable computing environment and is not intended to suggest any limitation as to the scope of use or functionality of the packet forwarding technique. Neither should the computing environment be interpreted as having any dependency or requirement relating to any one or combination of components illustrated in the exemplary operating environment. With reference to FIG. 1, an exemplary system for implementing the technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The packet forwarding technique may be described in the general context of computer-executable instructions, such as program modules, being executed by a computing device. Generally, program modules include routines, programs, objects, components, data structures, etc. that perform particular tasks or implement particular abstract data types. The technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the packet forwarding technique.

2.0 Packet Forwarding in a Multi-Radio, Multi-Hop Wireless Network

The packet forwarding technique generally provides an efficient forwarding of data packets through a multi-hop wireless network employing multi-radio nodes. As described previously, multiple communication links can exist between two neighboring multi-radio nodes. In addition, each multi-radio node can have one or more communication links with a plurality of its neighboring nodes. Given the foregoing network architecture, a route through the network from an initiating node to a destination node can be defined as a sequence of hops between intermediate nodes in the case where the destination node cannot be reached directly from the initiating node. The particular communication link utilized by each node forwarding a data packet to the next node on the route to the destination node is left up to the forwarding node to decide, assuming multiple communication links exists between the forwarding and receiving nodes. The technique provides an efficient and effective way to decide which of the multiple communication links to use in transmitting a data packet to the next node on the route.

In each multi-radio node in the wireless network, an output buffer is shared among the radios. Outgoing packets are stored in this buffer. The output buffer could be shared between all the radios of the node, or some subset of the radios if there are more than two. It is also possible that multiple subsets of two or more radios could share an output buffer such that there would be multiple buffers. In this latter case, the technique would simply be implemented independently for each subset of radios sharing an output buffer.

Figure 2:
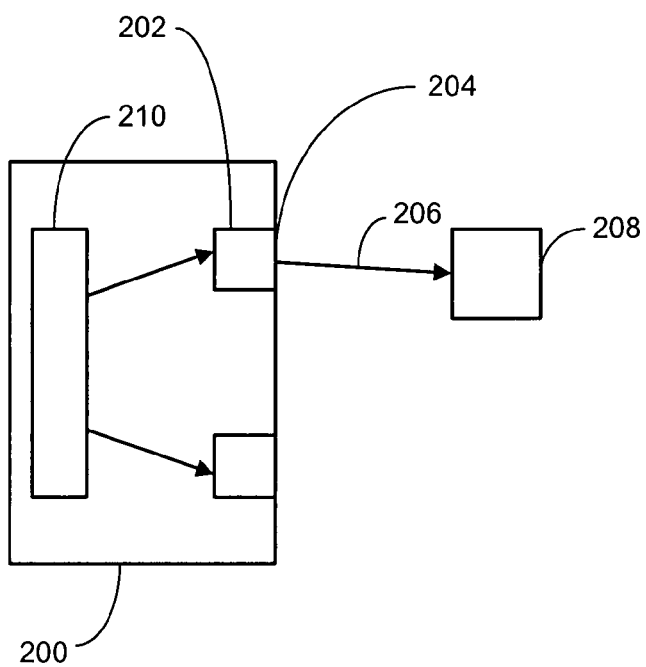
FIG. 2 is a block diagram illustrating a multi-radio node having a communication link via one of its radios to a neighboring node.

In general, whenever there is a transmission opportunity (as will be explained in more detail later) on one of the radios sharing an output buffer, the node examines the buffer and searches for the first packet that can be transmitted via the communication interface of this radio. In one embodiment of the technique, the node finds a transmission opportunity associated with just one communication link between it and another node of the network. In this case, the node searches for a packet being forwarded to just the node associated with the one communication link. For example, referring to FIG. 2, suppose there is a transmission opportunity on communication interface 204 of radio 202 of the multi-radio node 200, and that this communication interface has a communication link 206 with neighboring node 208. Then, node 200 will examine the data packets in the buffer 210 shared between its radios and searches for a packet whose next hop in its route through the network is node 208. If such a data packet exists, node 200 will send the packet using radio 202 via its interface 204 to node 208.

Figure 3:
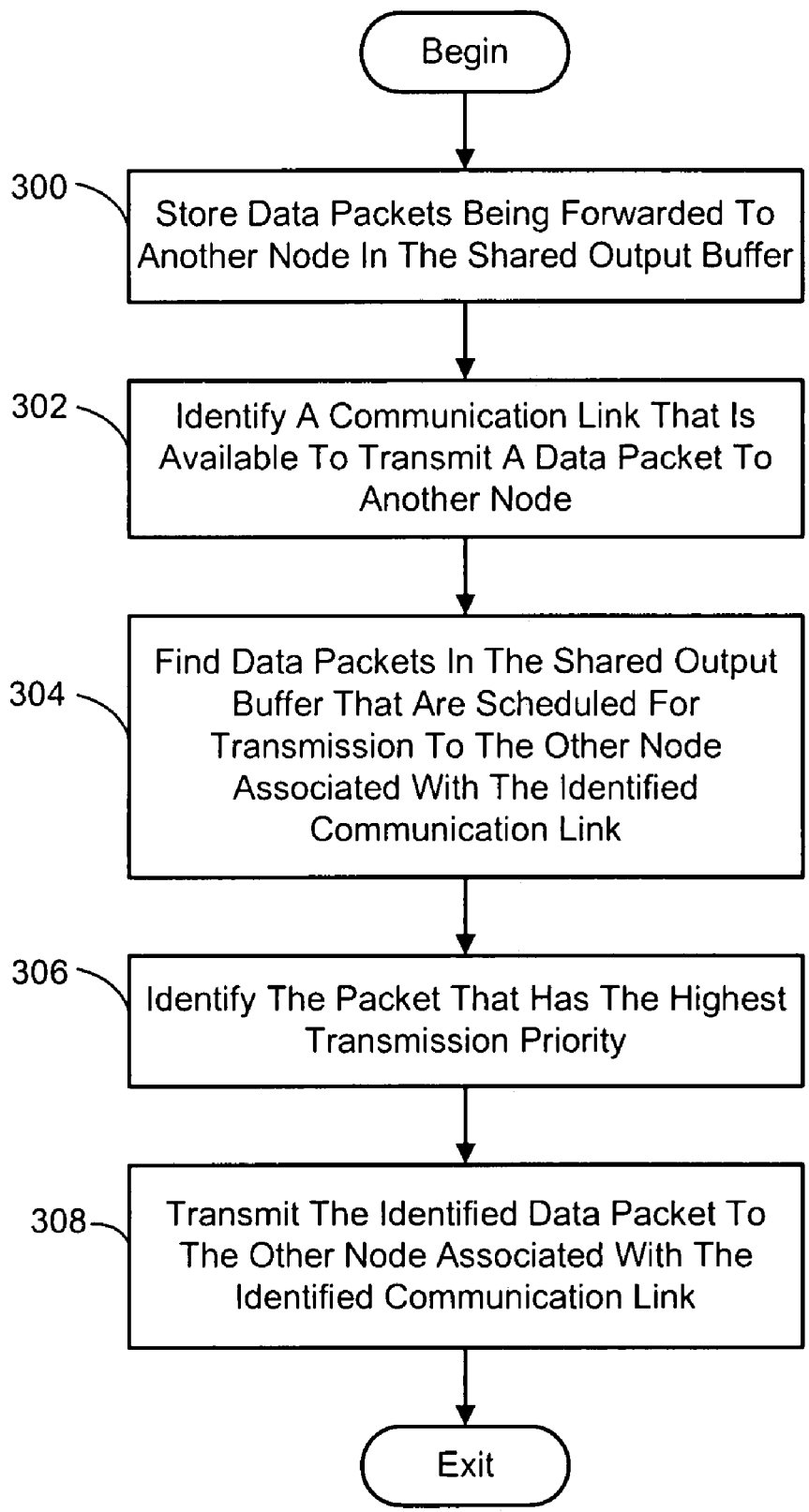
FIG. 3 is a flow diagram generally outlining one embodiment of a process for transmitting a data packet in the case where the multi-radio node finds a transmission opportunity associated with just one communication link between it and another node of the network.

More particularly, in the foregoing case where the multi-radio node finds a transmission opportunity associated with just one communication link between it and another node of the network, one embodiment of a process to transmit a data packet is as follows. Referring to the process flow diagram of FIG. 3, for each multi-radio node in the network, data packets being forwarded to another network node are first stored in the aforementioned shared output buffer (300). Each of the stored data packets has a transmission priority assigned to it in accordance with the particular protocols of the wireless network. Next, a communication link that is available to transmit a data packet between a radio of the multi-radio node sharing the output buffer and another node of the wireless network is identified (302). Once a communication link has been identified, the multi-radio node finds data packets stored in the shared output buffer that are scheduled for transmission to the other network node associated with the identified communication link (304). The node then identifies the packet in the discovered group that has the highest transmission priority (306). This identified data packet is then transmitted to the other node associated with the identified communication link (308).

Figure 4:
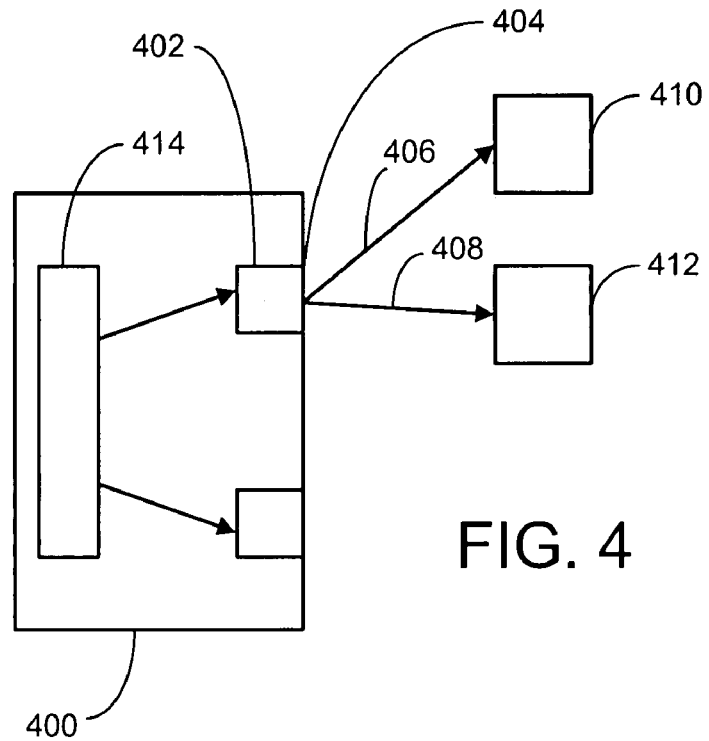
FIG. 4 is a block diagram illustrating a multi-radio node having communication links via one of its radios to two neighboring nodes.

In another embodiment, the multi-radio node finds transmission opportunities associated with more than one communication link, if they exist. In this latter case, the node searches for a packet being forwarded to any of the identified links. For example, referring to FIG. 4, suppose there are transmission opportunities on communication interface 404 of radio 402 of the multi-radio node 400, and that this communication interface has communication links 406, 408 with neighboring nodes 410, 412, respectively. Then, node 400 will examine the data packets in the buffer 414 shared between its radios and searches for a packet whose next hop in its route through the network is either node 410 or node 412. If such a data packet exists, node 400 will send the packet using radio 402 via its interface 404 to node 410 or node 412, as appropriate. It is noted that in this example, the multi-radio node has just two radios. There could be more. In addition, in the example, just two neighboring nodes had open communication links with one of the radios of the multi-radio node forwarding data packets. There could be more neighboring nodes with links to that same radio of the multi-radio node, and in that case these links would also be found and includes in the data packet search.

It is also noted that in the foregoing example, the multi-radio node found only communication links associated with one of its radios. This need not be the case. Instead, all or some of the radios sharing an output buffer could be included. For example, referring to FIG. 5, suppose there are transmission opportunities on the communication interface 504 of radio 502, and on the communication interface 506 of radio 508, of the multi-radio node 500. Also suppose that these communication interfaces 504, 506 have communication links 510, 512, 514, 516 with neighboring nodes 518, 520, 522, 524, respectively. In this case, node 500 will examine the data packets in the buffer 526 shared between the radios and search for a packet whose next hop in its route through the network is any of the nodes 518, 520, 522, 524. If such a data packet exists, node 500 will send the packet via the interface of the radio having the open communication link with the neighboring node that the packet is being forwarded to. It is noted that here again in this example, the multi-radio node has just two radios. There could be more. It is also noted that each radio of the multi-radio node could have open communication links to more neighboring nodes than shown in FIG. 5. In this latter case, these additional links would also be found and includes in the data packet search.

Figure 5:
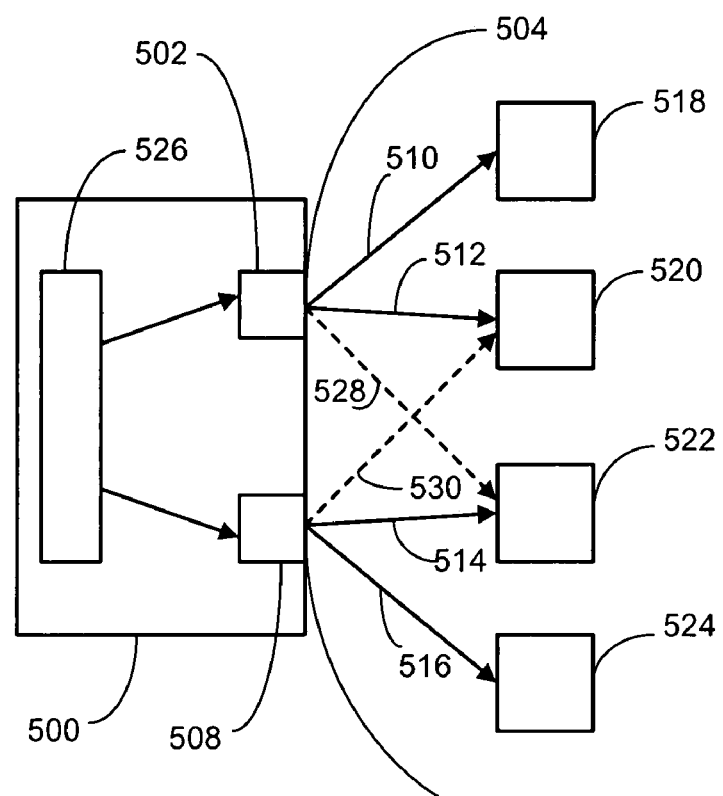
FIG. 5 is a block diagram illustrating a multi-radio node having communication links via both of its radios to four neighboring nodes, where in the case of two of the neighboring nodes both radios have a communication link with the node.

In the foregoing embodiment where the multi-radio node finds transmission opportunities associated with more than one communication link, it is also possible that more than one of the radios sharing an output buffer would be found to have an open communication link with the same node as illustrated by links 528, 530, which are shown as dashed lines in FIG. 5. Suppose that a data packed is selected for transmission to a neighboring node, such as node 520 in FIG. 5, which has two open communication links between it and the multi-radio node sending the packet. In such a case, the decision as to which to use can be random or based on the quality of the connection as will be described in more detail shortly.

Figure 6:
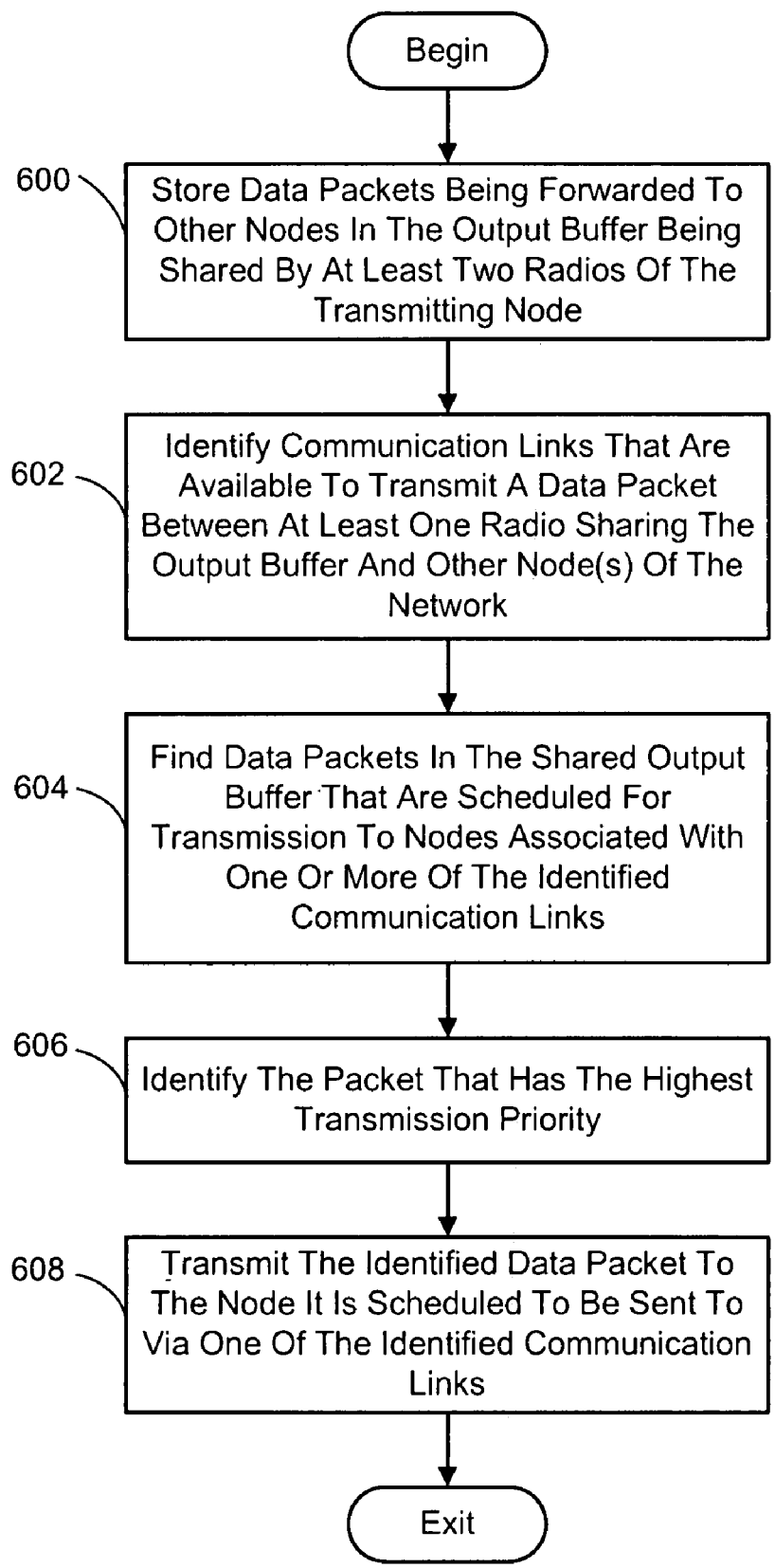
FIG. 6 is a flow diagram generally outlining one embodiment of a process for transmitting a data packet in the case where the multi-radio node finds transmission opportunities associated with multiple communication links between it and other nodes of the network.

FIG. 6 depicts a process flow diagram for transmitting a data packet based on the foregoing embodiment of the technique where transmission opportunities associated with more than one communication link are found. This process begins by storing data packets being forwarded from the multi-radio node in an output buffer shared by at least two radios of the multi-radio node (600). Once again, the stored data packets each have a transmission priority assigned to it in accordance with the particular protocols of the wireless network. Next, communication links that are available to transmit a data packet between at least one of the radios and another node or nodes of the wireless network, are identified (602). For example, this means that open links to more than one neighboring node from one of the radios could be found, and/or open links to more than one neighboring node from both of the radios could be found, and/or open links to the same neighboring node from more than one of the radios could be found. Once communication links have been identified, the multi-radio node finds data packets stored in the shared buffer that are scheduled for transmission to network nodes associated with one or more of the identified communication links (604). The node then identifies the packet in the discovered group that has the highest transmission priority (606). The identified data packet is then transmitted to the network node it is scheduled to be sent to via one of the identified communication links (608). If only one of the identified links is to this neighboring node, then the packet is sent via that link. However, if more than one of the identified communication links is to the node in question, then one of these redundant links is chosen to send the packet. In one embodiment, this is done on a random choice basis. In another embodiment, the communication link that is deemed to have the best connection quality is chosen to transmit a data packet. Any appropriate method of determining the connection quality of a communication link in a multi-hop wireless network can be employed for this purpose.

In regard to finding the aforementioned transmission opportunities by identifying a communication link or links that are available to transmit a data packet, several factor are considered. Generally this task involves identifying a communication link between a communication interface of a radio of the multi-radio that is open for transmitting data packets and if possible a communication interface of another node within transmission range of that radio that is open to receive data packets. If it is not possible to ascertain whether the communication interface of another node within transmission range is open to receive data packets it is assumed it is. This is accomplished using procedures appropriate for the wireless network. In addition, in one embodiment of the technique, only those links having a connection quality that exceed a minimum prescribed connection quality level are identified. Any appropriate method of determining the connection quality of a communication link in a multi-hop wireless network can be employed for this purpose. In the embodiments where just one communication link is identified per data packet transfer, the link that is first reported as being open for transmission by one of the radios sharing the output buffer can be chosen. In the embodiments where more than one communication link can be identified per data packet transfer, the links can be selected by first requesting a list of available communication links from one or more of the radios sharing the output buffer. The links identified in the list received from the each requested radio are then selected. Alternatively, the radio interfaces could trigger the process when they just become available. For instance, the links between the first radio that reports as being open for transmission and other nodes can be identified.

In regard to identifying the data packet having the highest priority among those scheduled for transmission to a neighboring node with an open communication link to the transferring multi-radio node, different methods of assigning priority may be used, such as priority based on time of arrival, or Quality of Service (QoS) parameters of the packet. It is noted that some prioritization schemes employed in the network may result in two data packets having the same priority. This situation can be handled by randomly selecting one of the qualifying data packets. In other cases, such as when priority is set by the time of arrival to the shared buffer in a first in-first out manner, each data packet will have a unique priority depending on when they arrived.

3.0 Combined Packet Forwarding in a Multi-Radio, Multi-Hop Wireless Network

In the context of the embodiment of the packet forwarding technique where the multi-radio node finds transmission opportunities associated with more than one communication link, an avenue exists to adopt a packet mixing technique that can result in fewer transmissions being necessary from a multi-radio node of the multi-hop wireless network. Generally, the mixing technique combines packets scheduled for transmission to neighboring nodes, and transmit the same combined packet to multiple ones of the neighboring nodes. There is a caveat however that, the receiving node must already have, or will receive, whatever information is needed to extract the packet or packets that are scheduled for transmission to that node from the other packets in the combined packet. Thus, in one embodiment of the technique a local mixing module is added to the multi-radio nodes of the network. In one embodiment, the procedure is the same as described above up to the point that a data packet is identified for transmission to a neighboring node. At that point, the multi-radio node re-examines the output queue and searches for data packets that can be mixed with the identified packet to provided other packets scheduled for forwarding to the neighboring nodes with open communication links with the transmitting multi-radio node. If there are packets that can be mixed then the packet mixing technique is employed. If not, then the identified data packet is transmitted without mixing it with other packets.

Figure 7:
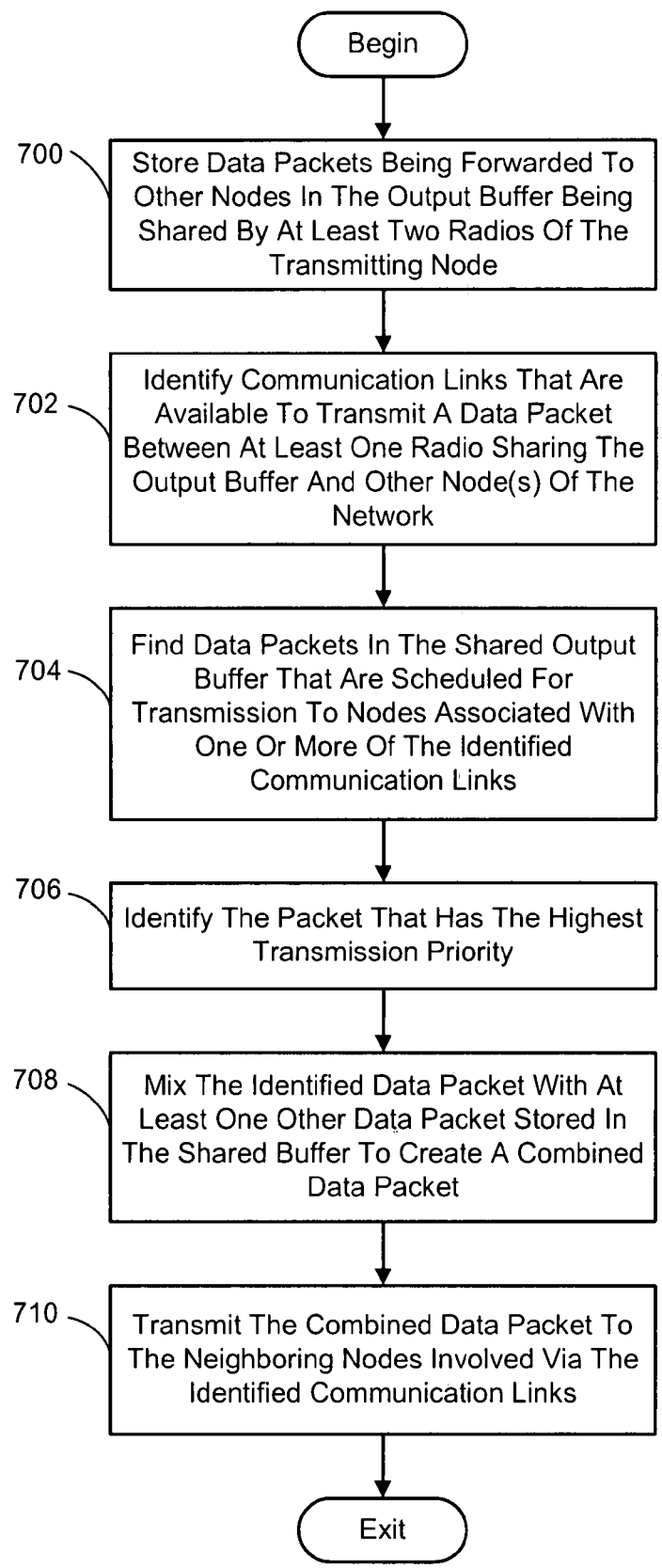
FIG. 7 is a flow diagram generally outlining one embodiment of a process for transmitting a data packet in the case where the multi-radio node finds transmission opportunities associated with multiple communication links between it and other nodes of the network, and employs packet mixing.

One embodiment of a process for implementing packet mixing in the packet forwarding technique (assuming a packet meeting the foregoing criteria is available for mixing) is shown in FIG. 7. The process begins by storing data packets being forwarded from the multi-radio node in an output buffer shared by at least two radios of the multi-radio node (700). The stored data packets each have a transmission priority assigned to it in accordance with the particular protocols of the wireless network. Next, communication links that are available to transmit a data packet between at least one of the radios and another node or nodes of the wireless network, are identified (702). Once communication links have been identified, the multi-radio node finds data packets stored in the shared buffer that are scheduled for transmission to network nodes associated with one or more of the identified communication links (704). The node then identifies the packet in the discovered group that has the highest transmission priority (706). The identified data packet is then mixed with at least one other data packet stored in the shared buffer to create the combined data packet (708). The other data packet or packets that are mixed with the identified packet must be scheduled for forwarding to a neighboring node associated with the identified communication links, and each neighboring node involved must already have, or will receive, the information necessary to extract the data packet it is scheduled to get, from the combined data packet. Once the combined data packet is created, it is transmitted to the neighboring network nodes involved via the identified communication links (710).

In regard to the mixing, one technique is the so-called COPE method. This method employs a mixing engine that maintains information about the packets each neighbor has, and identifies opportunities to mix the outgoing packets to reduce the number of transmissions. More specifically, each node snoops on the network and buffers packets it heard. Each node also informs its neighbors which packets it has overheard. Nodes can also passively infer what data packets a neighbor node has based on network protocols and prior outgoing transmissions. These steps allow nodes to know roughly what packets are available at each neighbor (i.e., "who has what?"). Knowing "who has what" in the neighborhood, a node can then examine its pending outgoing packets and form output mixture packets if possible. A heuristic approach for generating the mixture packets is employed, which takes the packet at the head of a buffer, and steps through the packet buffer to greedily add packets to the mixture, while ensuring the neighbors can successfully de-mix the resulting combined data packet. In the context of the packet forwarding technique disclosed herein, the data packet identified for transmission would take the place of the packet at the head of the buffer. In the COPE method, the process of mixing a data packet with at least one other data packet to create a combined data packet is accomplished by combining the data packets using an exclusive OR (XOR) procedure. A node receiving a combined data packet de-mixes it by XORing it with the packets making up the packet that are stored on the node.

Figure 8:
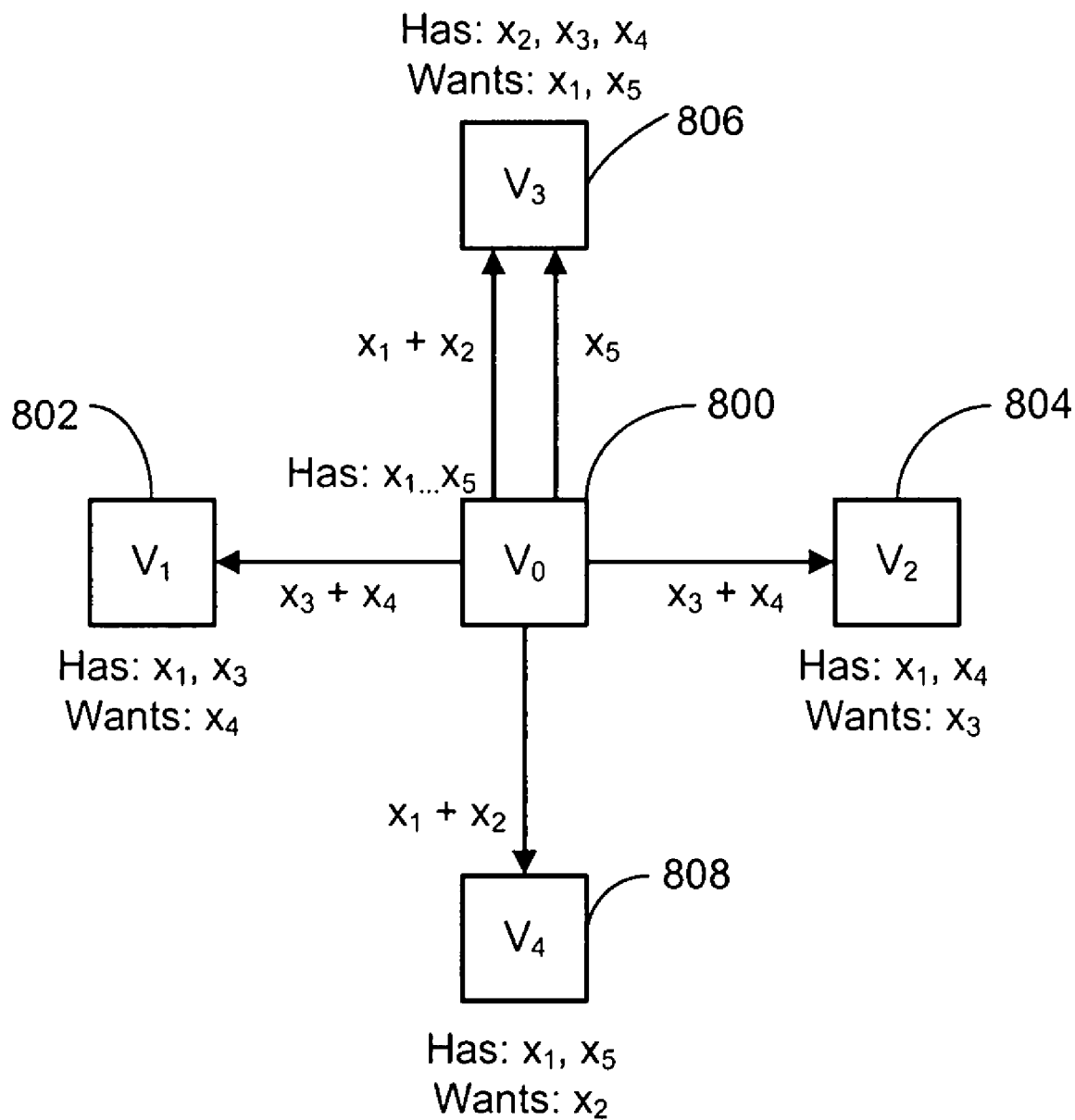
FIG. 8 is a block diagram illustrating the COPE packet mixing method.

An simple example of the COPE method is illustrated in FIG. 8. Consider a wireless router $v_0$ (800). Suppose it currently has five packets in its output queue, $x_1, \ldots, x_5$, and assume a lower indexed packet is an earlier packet. Node $v_0$ (800) knows that $v_1$ (802) has packets $x_1$ and $x_3$, and wants $x_4$; $v_2$ (804) has packets $x_1$ and $x_4$, and wants $x_3$; $v_3$ (806) has packets $x_2$, $x_3$, $x_4$, and wants $x_1$ and $x_5$; and $v_4$ (808) has packets $x_1$ and $x_5$, and wants $x_2$. The COPE method will use three transmissions: $x_1+x_2$, $x_3+x_4$, $x_5$, instead of five to transmit the packets needed by each of the other nodes. Note that '+' stands for the bitwise XOR of the packets. The neighboring nodes receive these transmissions, and in the case of the combined packets, extract the needed packet from it. For example, the combined packet $x_1+x_2$ is received by $v_3$. $v_3$ then uses stored packet $x_2$ to extract $x_1$ from the combined packet $x_1+x_2$ by XORing the combined packet with packet $x_2$.

In the context of the packet forwarding technique the combined data packets can be generally broadcast from a multi-radio node, such that it is received by all neighboring nodes within range that have open communication links. It is also possible to transmit the combined packet by unicasting to one of the recipients and let other nodes run on a promiscuous mode to receive the packet.

4.0 Other Embodiments

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for transmitting a combined data packet from a multi-radio node to another node in a multi-hop wireless network, comprising using a computer to perform the following process actions for each multi-radio node in the network:

storing data packets in a buffer shared by at least two radios of the multi-radio node, wherein each data packet is being forwarded from the multi-radio node to one of a plurality of neighboring nodes of the wireless network that are within communication range of the multi-radio node, and wherein each data packet has a prescribed transmission priority;

identifying communication links that are available to transmit a data packet between a radio of the multi-radio node sharing said buffer and at least some of said neighboring nodes;

identifying a data packet stored in the shared buffer that is scheduled for transmission to a neighboring node associated with one of the identified communication links and which has the highest priority among the data packets scheduled for transmission to a neighboring node associated with the identified communication links;

mixing the identified data packet with at least one other data packet stored in the shared buffer to create the combined data packet, wherein each of the at least one other data packets is a packet scheduled for forwarding to a neighboring node associated with the identified communication links, and wherein said mixing is performed whenever a neighboring node associated with the identified communication links that is to receive the combined data packet has information necessary to extract the data packet or packets mixed into the combined data packet, or will eventually also receive the information necessary to extract the data packet or packets mixed into the combined data packet; and transmitting the combined data packet to said neighboring network nodes associated with the identified communication links.

2. The process of claim 1, wherein the process action of mixing the identified data packet with at least one other data packet stored in the shared buffer to create the combined data packet, comprises combining the data packets using an exclusive OR (XOR) method.

3. The process of claim 1, wherein the process action of transmitting the combined data packet to said neighboring network nodes associated with the identified communication links, comprises an action of broadcasting the combined data packet to all neighboring network nodes within range.

4. The process of claim 1, wherein the process action of transmitting the combined data packet to said neighboring network nodes associated with the identified communication links, comprises an action of unicasting the combined data packet to said nodes via the identified communication links.

5. A computer-readable storage medium having computer-executable instructions stored thereon for transmitting a combined data packet from a multi-radio node to another node in a multi-hop wireless network, said computer-executable instructions comprising for each multi-radio node in the network:

storing data packets in a buffer shared by at least two radios of the multi-radio node, wherein each data packet is being forwarded from the multi-radio node to one of a plurality of neighboring nodes of the wireless network that are within communication range of the multi-radio node, and wherein each data packet has a prescribed transmission priority;

identifying communication links that are available to transmit a data packet between a radio of the multi-radio node sharing said buffer and at least some of said neighboring nodes;

identifying a data packet stored in the shared buffer that is scheduled for transmission to a neighboring node associated with one of the identified communication links and which has the highest priority among the data packets scheduled for transmission to a neighboring node associated with the identified communication links;

mixing the identified data packet with at least one other data packet stored in the shared buffer to create the combined data packet, wherein each of the at least one other data packets is a packet scheduled for forwarding to a neighboring node associated with the identified communication links, and wherein said mixing is performed whenever a neighboring node associated with the identified communication links that is to receive the combined data packet has information necessary to extract the data packet or packets mixed into the combined data packet, or will eventually also receive the information necessary to extract the data packet or packets mixed into the combined data packet; and transmitting the combined data packet to said neighboring network nodes associated with the identified communication links.

* * * * *